United States Patent [19]

Axer et al.

[11] 4,047,865

[45] Sept. 13, 1977

[54] APPARATUS MAKING PRESSED BOARD

[75] Inventors: Heinrich Axer, Nettetal; Gerd Roth, Kevelaer, both of Germany

[73] Assignee: G. Siempelkamp & Co., Krefeld, Germany

[21] Appl. No.: 624,780

[22] Filed: Oct. 20, 1975

Related U.S. Application Data

[60] Continuation-in-part of Ser. No. 532,375, Dec. 13, 1974, which is a division of Ser. No. 383,730, July 30, 1973, Pat. No. 3,904,336.

[30] Foreign Application Priority Data

Aug. 1, 1972 Germany ............................ 2237755

Nov. 14, 1972 Germany ............................ 2255712

[51] Int. Cl.[2] ............................................. B29J 5/04

[52] U.S. Cl. ...................................... 425/80; 425/308; 425/315; 425/338; 425/371

[58] Field of Search .................. 425/324 R, 371, 315, 425/404, 115, DIG. 200, 83, 80, 4 C, 455, 338, 339, 223, 308; 100/194, 196

[56] References Cited

U.S. PATENT DOCUMENTS

| | | | |
|---|---|---|---|
| 2,016,401 | 10/1935 | Thomas | 425/373 X |
| 2,493,194 | 1/1950 | Heino | 425/83 X |
| 2,975,470 | 3/1961 | Snelson et al. | 425/83 X |
| 2,997,096 | 8/1961 | Morrison et al. | 425/83 X |
| 3,144,376 | 8/1964 | Plumberg et al. | 425/404 X |
| 3,611,482 | 10/1971 | Hutz | 425/DIG. 200 |
| 3,758,249 | 9/1973 | Newby | 425/223 |

*Primary Examiner*—Robert L. Spicer, Jr.

*Attorney, Agent, or Firm*—Karl F. Ross

[57] ABSTRACT

In manufacturing pressed boards, a flowable mixture of thermosetting resinous material and filler is blown through one or more nozzles into a converging throat formed by a pair of relatively inclined perforated conveyor bands in which the mixture is compacted into a continuous, coherent and self-supporting web by the application of heat to preset the resinous material thereof. The web is transversely cut into individually manipulable sections which are fed by a stack conveyor to a platen press, operating in step with the feeding and cutting mechanisms, for final setting of the resin.

6 Claims, 2 Drawing Figures

APPARATUS FOR MAKING PRESSED BOARD

CROSS-REFERENCE TO RELATED APPLICATIONS

This application is a continuation-in-part of our co-pending application Ser. No. 532,375 filed Dec. 13, 1974 as a division of our earlier application Ser. No. 383,730 filed July 30, 1973, now U.S. Pat. No. 3,904,336.

FIELD OF THE INVENTION

Our present invention relates to an apparatus for making pressed board of the type in which a binder of thermosetting resinous material is blended with a filler and the resulting mixture is then compacted into sheet or plate form, the resin being subsequently cured to convert the compacted body into a solid board. Depending on the nature of the filler, which could consist of wood chips and/or cellulosic or other fibers, these pressed boards are generally known as chipboards or fiberboards.

BACKGROUND OF THE INVENTION

In the conventional manufacture of such pressed boards, the mixture of binder and filler is compacted in the cold state and later subjected to heat and pressure for setting the resin. Prior to such setting, the compacted body has only limited mechanical strength and is, therefore, difficult to handle. Problems exist, accordingly, in transporting such sheets or plates to a flat press (e.g. one of the multilevel type) for final shaping and setting.

OBJECT OF THE INVENTION

The object of our present invention, therefore, is to provide means for converting the aforedescribed mixture into an intermediate product of manufacture which is easy to handle and from which pressed board can be made by conventional treatment.

SUMMARY OF THE INVENTION

We have found, in accordance with our present invention, that an easily manipulable and coherent intermediate product in the manufacture of pressed board can be produced in an apparatus in which a flowable mixture of thermosetting resinous material and filler is introduced by one or more nozzles into a converging throat defined by a pair of perforated, endless conveyor bands with relatively inclined confronting surfaces, the perforations serving for the escape of a carrier fluid (usually air) which entrains the components of the mixture. The flowable mixture entering the throat is subjected to the action of heating means for thermally presetting the resinous binder thereof during compaction of the mixture between the conveyor bands into a continuous and coherent web. The term "setting" (or "presetting"), as herein used, encompasses both condensation and polymerization.

The heating of the mixture in the converging throat may be carried out dielectrically, as with the aid of electrodes constituted at least in part by a pair of pressure plates enveloped by the conveyor bands; these pressure plates could also be formed with channels for the circulation of a hot fluid therethrough. Alternatively, or in conjunction therewith, the carrier fluid itself could be preheated ahead of the nozzle or nozzles through which the mixture is entrained into the converging throat.

Depending on the degree of heating, which in general should be roughly commensurate with the degree of compression the mixture undergoes between the conveyor bands, the setting of the resinous material need be carried to only partial completion within the compacting stage. Thanks to this presetting, the mass issuing from that stage will have the shape of a coherent, continuous web which can then be further consolidated, with additional heating, in a final press.

As described and claimed in our above-identified prior applications and patent, final pressing and setting is carried out in a continuously operating stage adjoining the compacting stage so as to receive the web issuing from the narrow end of the throat thereof. The transition from the compacting stage to the final stage then takes place without significant reduction in web temperature in order to make the setting process chemically continuous. For this purpose, if the two compression stages are separated by a further treatment stage, the latter is provided with supplemental heating means for at least maintaining the web temperature at the value it has on exiting from the throat. If the intermediate stage is a finishing stage, designed to apply decorative or protective coverings such as paper strips, veneers or the like to either or each of the still tacky web surfaces for adhesion thereto, the desired maintenance of or increase in temperature level can be accomplished by preheating the covering material prior to its application to the web.

We have found, however, that such supplemental heating means can be omitted, even if the compacting or precompression stage is physically separated from the press, if the presetting in that stage is carried far enough to result in a self-supporting web adapted to be cut into individually manipulable sections. In accordance with our instant invention, therefore, the press is of the intermittently operating type and is synchronized with cutting and transport means for transversely dividing the web into a series of such sections and delivering them to the final press of the multilevel type in timed relationship with the operation thereof. The transport means advantageously include a stacking conveyor.

In cases where the filler consists predominantly of narrow particles, such as flat chips or short filaments, the setting process may not be uniform if these particles are randomly distributed within the resin matrix or binder. We therefore prefer to subject the particles upon their entrance into the throat to an orienting force which makes them lie substantially transversely to the direction of web growth or motion. This orientation may be accomplished with the aid of vibrators that agitate the oncoming particles, coated with resinous material, at the point where they impinge upon the mass already present within the throat.

BRIEF DESCRIPTION OF THE DRAWING

The above and other features will now be described with reference to the accompanying drawing in which.

SPECIFIC DESCRIPTION

Figure 1:
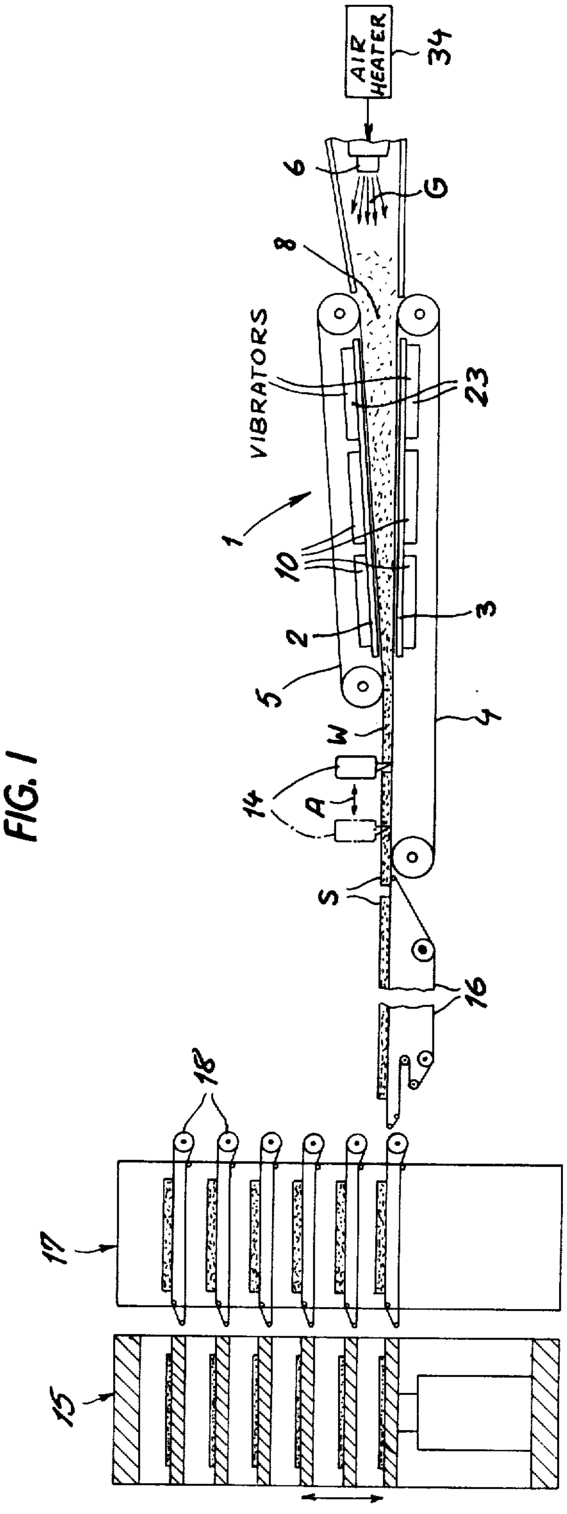
FIG. 1 is a side-elevational view of an apparatus according to our invention.
Figure 2:
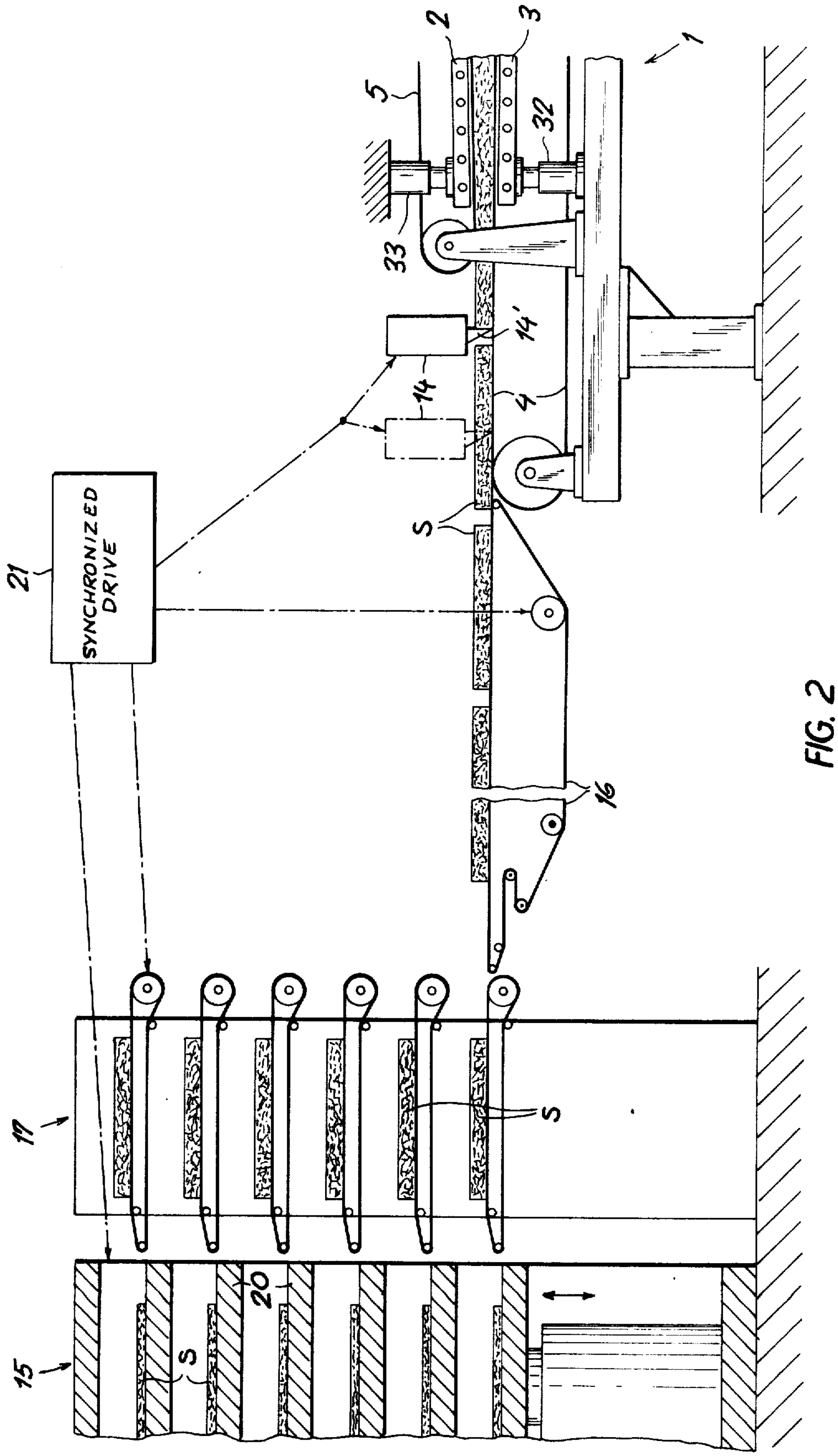
FIG. 2 is an enlarged, somewhat diagrammatic side-elevational view of part of the apparatus of FIG. 1.

The apparatus shown in FIGS. 1 and 2, generally similar to the one disclosed in our above-mentioned U.S. Pat. No. 3,904,336, comprises a compacting stage 1 for a flowable mixture of resinous binder and filler, such as wood chips admixed with two interacting components of a thermosetting resin (e.g. phenolformaldehyde) along with a catalyst therefor. The mixture is supplied by one or more nozzles 6 through which it is introduced with the aid of a carrier gas represented diagrammatically by arrows G. Nozzle 6 opens into a narrowing inlet guide 9, formed from stationary plates, which terminates at the broad end of a converging throat 8 defined by an upper compression plate 2, a lower compression plate 3 and two endless screen-type conveyor bands 4, 5 respectively enveloping the plates 3 and 2. The plates 2 and 3 are adjustably supported on respective plungers 32, 33 which may be hydraulically actuated to vary the effective separation of the plates and of the conveyor bands, i.e. the width of the throat 8. Upon the escape of the entraining carrier gas through the interstices of conveyor bands 4 and 5, the mixture of binder and filler leaves the throat 8 at its narrow end as a continuous, coherent and self-supporting web W.

In order to impart the necessary coherency to the web, the mixture compacted in throat 8 is subjected to the action of heating means 10, here shown as three mutually insulated heating units inserted in the compression plates 2 and 3 along the conveyor path. As particularly illustrated in our prior patent, each of these units comprises a high-frequency generator working into an amplifier whose output energizes a pair of electrodes having confronting sides in line with corresponding surfaces of the compression plates. If individual adjustment of the heating effect at different locations is not required, the plates 2, 3 may themselves be designed as heating electrodes.

As also shown in the prior patent, the heaters 10 could be replaced by channels 2′, 3′ in compression plates 2 and 3 serving for the circulation of a heating fluid therethrough.

As schematically indicated in FIG. 1, the carrier gas (e.g. air) blown through nozzle 6 may be preheated at 34 to supply all or part of the heat needed for at least presetting the resinous material of the injected mixture.

FIG. 1 also shows vibrators 23 at the entrance end of throat 8, i.e. in the position of the first heater 10, designed to promote a transverse orientation of resin-coated particles blown into the throat 8.

The lower conveyor 4 is shown to extend beyond the downstream end of the upper conveyor 5 to form a supporting surface for the web W coacting with a conventional cutter 14 which is horizontally reciprocable, as indicated by an arrow A, above that surface so as to travel at the web speed while a blade 14′ thereof is lowered to sever the web into a series of sections S of predetermined length. Thanks to the precompression and presetting experienced in stage 1, these sections 16 are individually manipulable and can therefore be further entrained by an ancillary conveyor 16 which feeds them to a stacking conveyor 17 provided with endless-belt trays 18, e.g. as described in U.S. Pat. Nos. 3,050,200 and 3,077,271. The trays 18 elevate the web sections S to the levels of the several stages of a multilevel press 15 provided with heated platens 20 in which final curing can take place. A mechanism 21 for synchronizing the drives of cutter 14, conveyor 16, stacker 17 and press 15 has been diagrammatically illustrated in FIG. 2. Cutter 14 may be designed as a band saw.

We claim:

1. In an apparatus for making pressed board from thermosetting resinous material and filter, in combination:

a a pair of perforated, endless conveyor bands with generally horizontal, relatively inclined confronting surfaces forming a converging throat between them;

nozzle means adjacent said conveyor bands for continuously blowing a substantially horizontal stream of thermosetting resinous material and filler entrained by a carrier fluid into said throat from the broad end thereof;

heating means at said throat for thermally presetting said resinous material during compaction of the mixture between said conveyor bands into a continuous, coherent and self-supporting web;

cutter means downstream of said throat for transversely dividing said web into a series of individually manipulable sections;

a press with a multiplicity of heating stages at different levels synchronized with said cutter means for further compacting said sections with final setting of said resinous material; and transport means for delivering said sections from said cutter means to the several levels of said press in timed relationship with the operation thereof.

2. The combination defined in claim 1 wherein said transport means comprises a stacking conveyor.

3. The combination defined in claim 1 wherein said cutter means comprises a movable blade carrier and drive means for reciprocating said blade carrier along the path of said web.

4. The combination defined in claim 3 wherein said conveyor bands include an upper conveyor and a lower conveyor, said lower conveyor having a web-supporting portion extending beyond the downstream end of said upper conveyor, said movable blade carrier coacting with said web-supporting portion.

5. The combination defined in claim 1 wherein said heating means comprises a heater for said carrier fluid ahead of said nozzle means.

6. The combination defined in claim 1 wherein said filler consists predominantly of narrow particles, further comprising orienting means at said throat for positioning said particles in said stream generally transversely to the direction of motion of said conveyor bands.

* * * * *